July 11, 1950   J. B. WALKER   2,515,104
LENS ADJUSTING MECHANISM
Filed April 19, 1949

INVENTOR
JOSEPH B. WALKER

BY Westall & Westall
ATTORNEYS

Patented July 11, 1950

2,515,104

UNITED STATES PATENT OFFICE 2,515,104

LENS ADJUSTING MECHANISM

Joseph B. Walker, Hollywood, Calif.

Application April 19, 1949, Serial No. 88,350

6 Claims. (Cl. 88—57)

This invention relates to lens adjusting mechanism adapted particularly for use with motion picture and television cameras. This application is a continuation in part of my co-pending applications S. N. 791,897, filed December 15, 1947, now Patent No. 2,506,947, dated May 9, 1950; S. N. 32,160, filed June 10, 1948; and S. N. 72,508, filed January 24, 1949.

The progressively magnification of a photographic or televised object may be accomplished in prior art cameras equipped with multiple lens systems by moving the elements relative to one another. While such relative movement of the lens elements from their prearranged relationship, in which the object is in critical focus, will necessarily disturb the focal adjustment of the system, critical focus may be maintained upon the object by coincidentally adjusting other elements of the system. In accordance with the operation of the apparatus of my Patent No. 1,898,471, dated February 21, 1933 and of each of the applications above-identified, while one of the lens elements is moved manually to effect the desired change in magnification of the image, focal compensation, by adjustment of other elements of the system is coincidentally accomplished by cam mechanism, actuated by the manually movable lens assembly. By provision of an adjustable cam the mechanism may provide different movement patterns for lens elements having different optical characteristics. As pointed out in my co-pending application S. N. 72,508, while the degree of the compensating movement required in the secondary lens varies with the distance of the photographic or televised object from the camera, for any pre-determined movement of the primary lens, the cam contour, which determines the pattern of movement of the secondary lens system, may remain the same for any specific combination of lens elements. With the cam secured in the contour required for focal compensation throughout the range of movement of the primary lens, the entire cam is shifted so as to provide a progressively greater or lesser movement in the secondary lens in accordance with the proximity of the object to the camera.

The present invention contemplates essentially improvements in apparatus adapted for the operation and utility above-described and more specifically provides mechanism of a novel form and arrangement for accomplishing the same results as the apparatus of my application last-identified, wherein a bell crank is utilized to transmit the motion of the cam, induced by the follower carried by the primary lens, to the secondary lens.

It is therefore a principal object of the present invention to provide a cam mounted upon a straight bar pivoted at one end and having a gear rack connected to the opposite end for actuating gear mechanism by which axial movement of a secondary lens is induced, whereby movement of the cam in response to movement of the primary lens carrier is effective to shift the secondary lens to a degree sufficient to compensate for the focal maladjustment resulting from the change of position of the primary lens incident to varying the magnification of the subject in the image produced by the system.

Another object hereof is the provision of mechanism of a type referred to wherein the cam assembly is pivoted at one end for actuating gear mechanism associated with its opposite end by which the secondary lens is shifted synchronously with the primary element so as to maintain the subject in focus throughout the range of its magnification.

Other objects and corresponding advantages, such, for example as greater simplicity of construction, conservation of space within the camera, maximum efficiency of operation, and economy of manufacture will be apparent to those of skill in the art upon an examination of the following description read in the light of the accompanying drawings, in which.

Figure 1:
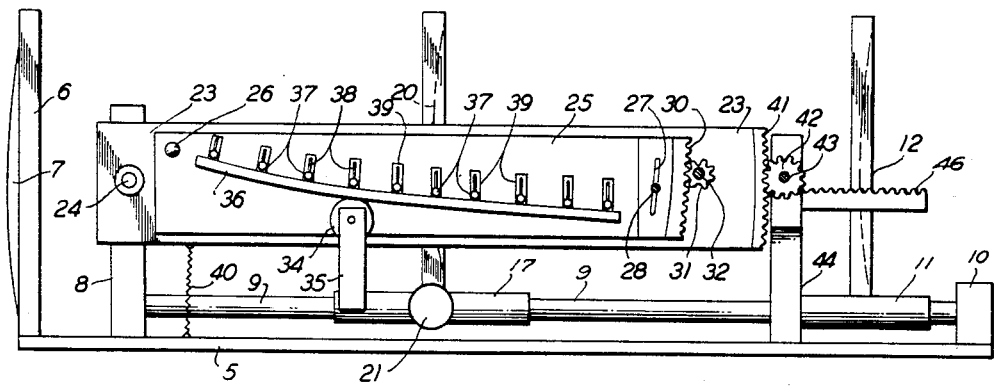
Fig. 1 is a side elevation of a lens adjusting mechanism embodying my invention.
Figure 2:
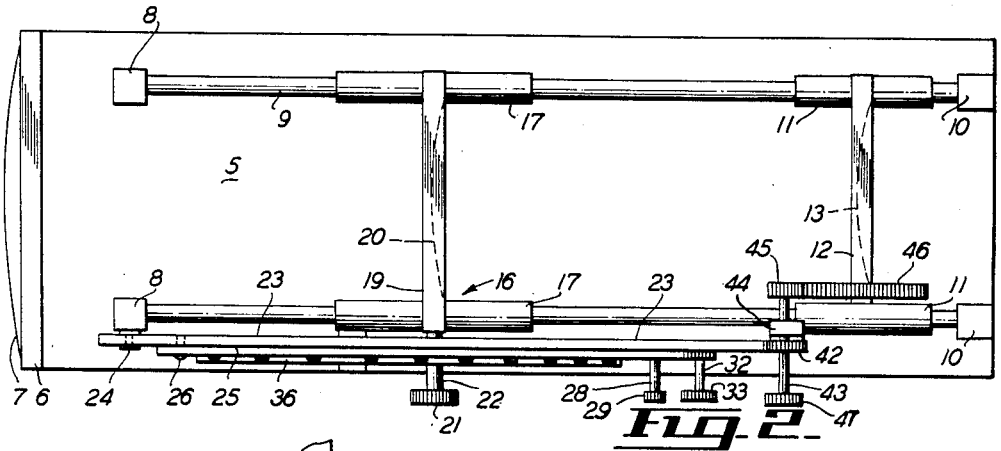
Fig. 2 is a top plan view of the equipment.
Figure 3:
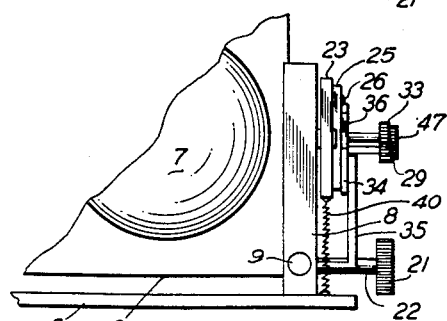
Fig. 3 is a broken front elevation of the apparatus.

Referring to the drawings more in detail, the numerals of which indicate similar parts throughout the several views, 5 designates a supporting base upon one end of which is a lens frame 6 for a stationary forward lens 7. Rearwardly of the lens 7 and adjacent the respective lateral edges of the base 5 are a pair of posts 8 in which the foremost ends, respectively, of a pair of guide rods 9, are mounted. The rods 9 extend rearwardly above and in parallel relation to one another and to the base 5 and have their rearward ends similarly mounted in blocks 10 carried by the opposite end of the base.

Slidable on the rods 9 and forward of the blocks 10, are a pair of sleeves 11 upon which is mounted a standard 12. Carried within the standard is a secondary lens element 13 adapted to be shifted along the optical axis synchronously with the movement of a primary lens, about to be described.

Intermediate the lens elements 7 and 13, is a lens carrier 16, comprising a pair of sleeves 17, slidable on the respective rods 9, and a lens frame 19, mounted upon and extending between the sleeves 17. A third, primary lens element 20 mounted in the frame 19 is thus adapted to be shifted axially between the posts 8, defining one end of its range of movement and the standard 12 for the back lens assembly. The primary lens 20 is manually moved on the rods 9 and to facilitate this operation, a knob 21 is secured to the sleeve 17 at one side of the apparatus by a shaft 22 extending through the side of the casing (not shown) for the lens system. Thus the direction and speed of axial movement of the primary lens 20 may be altered to correspondingly vary the magnification of the subject in the image as occasion demands.

In order to synchronize the adjustment of the secondary lens 13 with the movement of the primary lens 20 so as to maintain the focus throughout adjustment of the primary lens, I provide a bar 23 having one end pivoted as at 24 to the side of one of the posts 8. The opposite end of the bar 23 terminates adjacent but forward and laterally of the back lens assembly. One end of an elongated flat cam plate 25 is pivoted as at 26 to the bar 23 adjacent but slightly above and rearward of the point of pivoting of the bar to the post 8. A slot 27 formed in the opposite end of the cam plate 25 delineates an arc having a center on the point of pivoting 26 of the plate to the bar 23, and is penetrated by a clamping screw 28, threaded into the bar. A knob 29 on the outer end of the screw 28 permits the plate 25 to be secured firmly against pivotal movement relative to the bar. Upon release of the pressure of the screw 28 upon the cam plate 25, the latter may be swung on its pivot relative to the bar, and to facilitate this operation, the end of the plate carries an arcuate gear rack 30, parallel to the slot 27. In mesh with the teeth of the rack 30 is a pinion 31 which is secured upon a shaft 32, journalled in the bar 23. Rotary adjustment of the pinion 31 to raise and lower the cam plate 25 relative to the bar, is accomplished manually by a knob 33 secured to the outer end of the shaft 32. Both the shaft 32 and screw 28 may be projected through suitable openings in the casing in which the apparatus is preferably enclosed, if desired.

The bar and cam plate assembly is normally supported by a roller 34, journalled in an upstanding bracket 35 carried by the sleeve 17 therebelow. The roller 34 engages the underside of a flexible cam 36, comprising a steel strip, which is secured across the cam plate 25 by a plurality of screws 37 extending through vertical slots 38 in a corresponding number of equi-spaced lugs 39 connected to or integral with the upper edge of the cam 36. The screws 37 are threaded into the cam plate 25 but may be loosened to permit variation in the contour of the cam 36. When tightened, the screws 37 function to lock the cam 36 in its pre-adjusted form. Thus depending upon the contour of the cam and the adjustment of the relation between the rack 30 and pinion 31, the movement of the primary lens 20 upon the guide rods 9 is effective to variously raise or lower the cam plate 25. With the locking screws 37 tightened, the movement of the cam plate 25 will be transmitted to the bar 23, the rearward end of which being correspondingly raised or lowered. 40 indicates a spring, interposed between the bar 23 and the base 5 to maintain the cam 36 and roller 34 engaged during operation of the device as will be obvious.

The rearward swinging end of the bar 23 carries a gear rack 41 forming an arc having its center on the pivot 24 whereby the motion of the bar in a vertical arc is effective to induce rotary motion in a pinion 42 secured upon a short shaft 43 which is journalled in a suitable support 44 mounted upon the base 5. The shaft 43 extends laterally to a point adjacent but offset from the path of movement of the standard 12 and has keyed or otherwise secured thereto a pinion 45 which is in mesh with a gear rack 46 secured to the side of the standard 12, whereby rotation of the pinion 42 in response to vertical movement of the gear rack 41 is effective to turn the shaft 43 and pinion 45 and shift the standard 12 and secondary lens 13 along the optical axis. 47 indicates a knob secured to the outer end of the shaft 43 by which the bar 23 may be raised and lowered manually and the secondary lens correspondingly shifted for facilitating preliminary adjustment of the cam 36.

The operation and utility of the mechanism is further described as follows: With the primary lens 20 advanced to its extreme position the contour of the cam 36 may be adjusted for the particular combination of lenses composing the system. The cam screws 37 are loosened and the secondary lens 13 is shifted to bring the object into sharp focus. The corresponding end of the cam 36 is then lowered against the roller 34 and the adjacent cam screw 37 is tightened. The primary lens 20 is thereupon moved rearwardly to place the roller 34 directly below the second screw 37. This movement of the lens 20, while varying the magnification of the object, compels a corresponding axial adjustment of the secondary lens 13 in order to maintain the focus. This adjustment is accomplished manually by rotary adjustment of the knob 47 which alters the angular disposition of the bar 23. The portion of the cam 36 directly above the roller 34 is thereupon placed in contiguous relationship with the roller and the adjacent screw 37 tightened. In like manner the position of each portion of the cam 36, required to accomplish the complementary adjustment of the secondary lens 13 for each corresponding position of the primary lens 20, is critically determined. Upon thus establishing the contour of the cam 36, the lens system is ready for use, critical focus of the object being assured throughout the range of magnification permitted by the limited extent of movement of the primary lens assembly. The primary lens 20 may be shifted along the guide rods 9 at will to obtain any desired degree of magnification of the object in the image and complementary focal adjustment of the secondary lens 13 is assured by the cam 36, bar 23 and gear mechanism. E. g. as the primary lens 20 is moved rearwardly the spring 40 maintains the cam upon the roller 34, raising or lowering the bar in accordance with the pre-set contour of the cam. The pinion 42 is rotated by the rack 41 incident to this movement of the bar so as to shift the secondary lens element through the rack 46 and pinion 45.

To photograph or televise any object located at a different distance from the camera requires a progressively different focal adjustment of the secondary lens 13 throughout the range of movement of the primary lens 20. However, the contour of the cam 36, which determines the pattern of movement of the secondary lens 13 remains the same, effective compensation for variation in distance between the camera and object being made by altering the angular disposition of the cam plate 25 and entire cam 36. This is accomplished by releasing the screw 28 and raising or lowering the cam plate 25 by manipulation of the knob 29. The locking screw 28 is then again secured so as to maintain the corrected angular relationship of the cam plate and bar. The required focal adjustment of the secondary lens 13 throughout the range of movement of the primary lens 20 is then assured by the cam without the changing of the contour of the latter.

As the apparatus depicted in the drawings and hereinabove described is only illustrative of one form of my invention, it will be understood that numerous changes in size, design, shape, number and proportion of the various parts may be made, and specifically that a rotary focusing mount of conventional construction may be substituted for the rack 46 for transmitting the motion of the rearward end of the bar 23 to the secondary lens assembly, that the forward lens 7 may be mounted in a conventional manner for axial adjustment, and that the relatively movable lens assemblies may include any desired number of lens elements of any type well-known in the art, without departing from the spirit of my invention as defined by the appended claims.

What I claim and desire to secure by Letters Patent is:

1. In a lens system, a supporting member, a pair of lenses, means to slidably support and maintain said lenses axially coincident upon said supporting member for movement in directions toward and away from one another, a bar and a cam plate, means to pivotally mount corresponding ends of said bar and cam plate to said support and to said bar, respectively, means to secure said cam plate against pivotal movement relative to said bar, a cam carried by said cam plate, a cam follower connected to one of said lenses to engage said cam and, in response to movement of said last-named lens, to swing said cam, plate and bar about the pivot for said bar, and means to transmit the pivotal movement of said bar to the other lens.

2. In a lens system, a supporting member, a pair of lenses slidably carried by said supporting member in coaxial relationship for movement of each thereof toward and away from one another relative to said member, a bar having one end pivoted on said supporting member, a cam plate pivoted to said bar at a point adjacent the pivot of said bar to said supporting member, means to secure said cam plate and bar against relative pivotal movement, cam mechanism operatively interposed between said cam plate and one of said lenses to swing the plate and bar on the pivot of the latter in response to movement of said last-named lens, and gear mechanism to transmit movement of the swinging end of said bar to the other of said lenses.

3. In a lens system, a supporting member, a primary lens, a secondary lens disposed rearwardly of the primary lens, a bar pivoted to said supporting member forward of said primary lens, the swinging end of said bar extending rearwardly to adjacent said secondary lens, cam mechanism operatively interposed between said primary lens and said bar to swing the latter on its pivot in response to movement relative to said supporting member of said primary lens toward the secondary lens, and gear mechanism to shift said secondary lens relative to said supporting member in response to movement of said bar.

4. In a lens system, a base, a pair of lenses, each reciprocably mounted upon said base for coaxial movement toward and away from one another, a member having one end pivotally mounted upon said base, gear mechanism carried by the opposite end of said member to transmit movement of the last-named end of said member to one of said lenses, and cam mechanism carried by said member between the pivot thereof and said gear mechanism, actuated by movement of the other of said lenses, to swing said member on its pivot.

5. In a lens system, a supporting member, a pair of lenses slidably carried by said supporting member in coaxial relationship for movement of each thereof toward and away from one another relative to said member, a bar having one end pivoted on said supporting member, a cam plate pivoted to said bar at a point adjacent the pivot of said bar to said supporting member, means to lock said cam plate and bar against relative pivotal movement, a cam carried by said cam plate, follower mechanism connected to one of said lenses engageable with said cam to swing said cam plate and bar on the pivot of the latter, gear mechanism to transmit movement of the swinging end of said bar to the other of said lenses, and a handle to manually actuate said gear mechanism.

6. In a lens system, a base, a pair of lenses, each reciprocably mounted upon said base for coaxial movement toward and away from one another, a member pivotally mounted upon said base, gear mechanism connected to the opposite end of said member and actuated normally by movement of the last-named end of said member to shift one of said lenses axially, cam mechanism connected to said member and actuated by movement of the other of said lenses to swing said member on its pivot, and a handle to manually actuate said gear mechanism.

JOSEPH B. WALKER.

REFERENCES CITED

The following references are of record in the file of this patent:

UNITED STATES PATENTS

| Number | Name | Date |
| --- | --- | --- |
| 1,755,105 | Douglass | Apr. 15, 1930 |
| 1,790,232 | Flora | Jan. 27, 1931 |
| 1,898,471 | Walker | Feb. 21, 1933 |
| 2,159,394 | Mellor et al. | May 23, 1939 |
| 2,165,341 | Capstaff et al. | July 11, 1939 |